United States Patent

Gileta

[11] Patent Number: 5,292,055
[45] Date of Patent: Mar. 8, 1994

[54] GAS SHROUDED WAVE IMPROVEMENT

[75] Inventor: John H. Gileta, Chateauguay, Canada

[73] Assignee: Electrovert Ltd., LaPrairie, Canada

[21] Appl. No.: 13,973

[22] Filed: Feb. 4, 1993

Related U.S. Application Data

[63] Continuation-in-part of Ser. No. 961,781, Oct. 15, 1992, Pat. No. 5,240,169, which is a continuation-in-part of Ser. No. 860,316, Mar. 30, 1992, Pat. No. 5,203,489, which is a continuation-in-part of Ser. No. 804,904, Dec. 6, 1991, abandoned.

[51] Int. Cl.$^5$ ............................. B23K 1/00; B23K 3/08
[52] U.S. Cl. ................................. 228/180.1; 228/219; 228/37; 228/42
[58] Field of Search ............... 228/180.1, 219, 260, 228/37, 42, 43, 56.1, 56.2

[56] References Cited

U.S. PATENT DOCUMENTS

| | | | |
|---|---|---|---|
| 4,412,641 | 11/1983 | Fuchs et al. | 228/37 |
| 5,176,307 | 1/1993 | Hagerty et al. | 228/37 |
| 5,203,489 | 4/1993 | Gileta et al. | 228/37 |
| 5,228,614 | 7/1993 | Elliott et al. | 228/37 |
| 5,240,169 | 8/1993 | Gileta | 228/37 |

*Primary Examiner*—Samuel M. Heinrich
*Attorney, Agent, or Firm*—Darby & Darby

[57] ABSTRACT

A cover plate extends over at least part of a solder reservoir and has a slot for a solder wave to extend up above the cover plate. Shield gas is supplied under the cover plate to blanket the solder wave and prevent air from contacting the solder wave and circuit boards passing through the solder wave. Circuit boards are generally supported by conveyor fingers at side edges and the fingers pass through the solder wave. End shrouds are provided at both ends of the solder wave to prevent the entry of air through the conveyor fingers and to ensure that the side edges of the circuit board are uniformly blanketed by shield gas directed to the side edges passing up through the slot in the cover plate. The under surface, front edge, back edge and side edges of a circuit board are therefore uniformly blanketed by shield gas as the board passes through a solder wave.

44 Claims, 2 Drawing Sheets

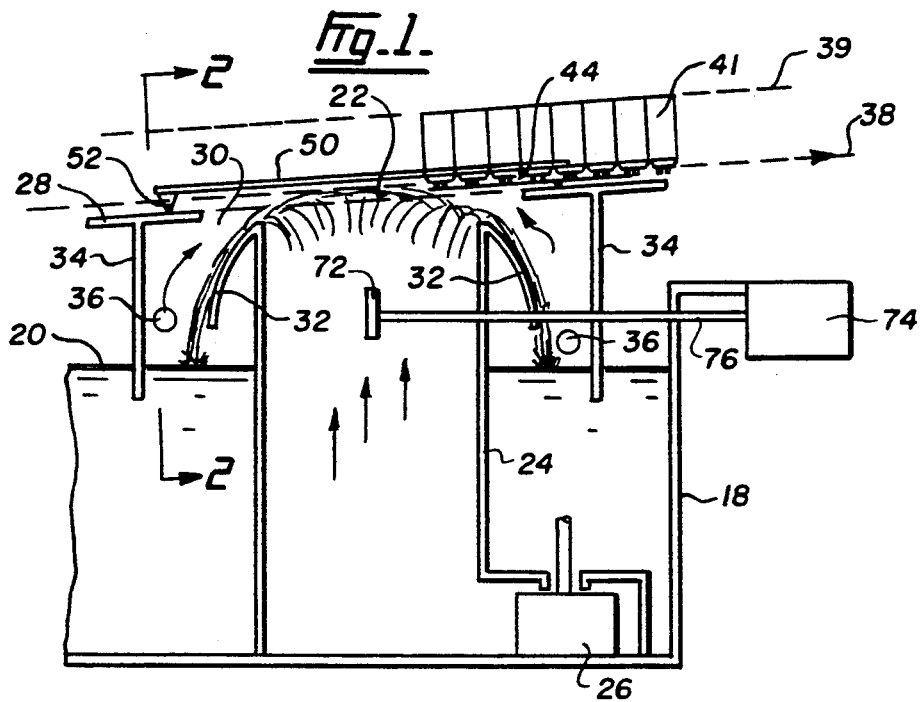
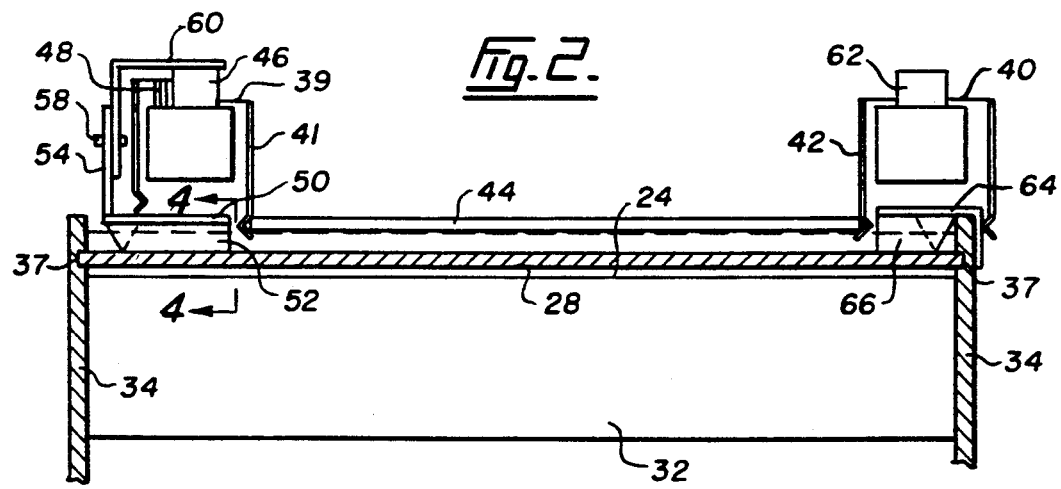
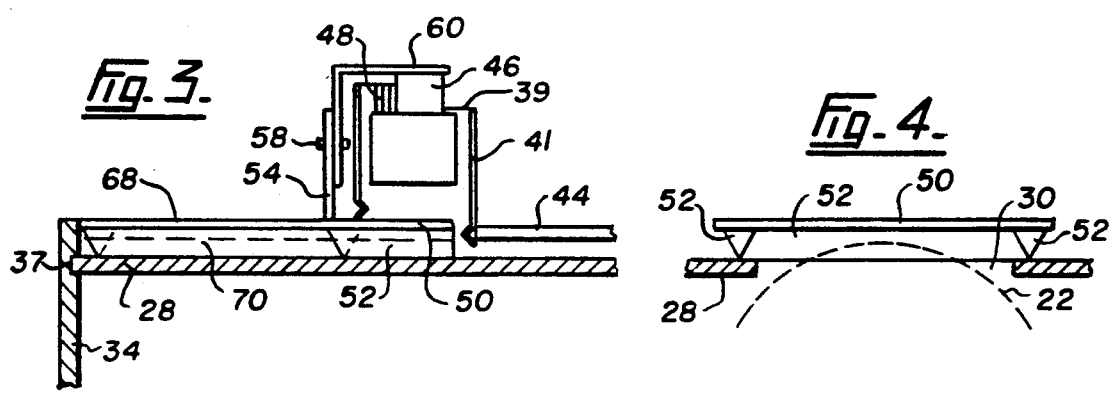

GAS SHROUDED WAVE IMPROVEMENT

CROSS REFERENCE TO RELATED APPLICATIONS

The present application is a continuation-in-part of co-pending application Ser. No. 07/961,781 filed Oct. 15, 1992, now U.S. Pat. No. 5,240,169, which in turn is a continuation-in-part of co-pending application Ser. No. 07/860,316 filed Mar. 30, 1992, now U.S. Pat. No. 5,203,489, which in turn is a continuation-in-part of co-pending application Ser. No. 07/804,904 filed on Dec. 6, 1991 now abandoned.

TECHNICAL FIELD

The present invention relates to wave soldering of elements such as printed wiring boards and circuit boards, and more specifically to solder coating of wettable metallized surfaces or solder joining at least two wettable metallized surfaces on wiring boards in a solder wave wherein the wave is blanketed in a shield gas atmosphere and wherein board ends are also blanketed with shield gas prior to, during and subsequent to the passing of the board through the solder wave.

BACKGROUND ART

Today printed wiring boards and circuit boards have smaller wettable surfaces to be solder coated and joined. In co-pending application Ser. Nos. 07/961,781 and 07/860,316 is disclosed gas shrouded wave soldering wherein a solder wave has a cover with a slot for the solder wave to project therethrough and wherein a shield gas, preferably nitrogen and substantially oxygen free, is supplied underneath the cover so that the solder is applied to circuit boards and the like when they are substantially blanketed by the shield gas. In the aforesaid co-pending applications, soldering occurs in a shield gas atmosphere, referred to as an inert gas and this includes nitrogen. The shield gas prevents oxides forming on the liquid solder surfaces, and in another embodiment, a reducing gas such as hydrogen is included in the shield gas in a non-explosive mixture, to provide fluxing to the surfaces to be soldered or solder coated. U.S. Pat. No. 5,044,542 discloses shield gas wave soldering wherein shield gas or a reducing gas blankets the solder wave during the soldering step. The benefits of soldering in an atmosphere which is substantially oxygen free are known.

In our co-pending applications a cover is provided to at least partially cover a solder reservoir and shield gas passing on both sides of the solder wave blankets the solder wave and the solder within the reservoir. By utilizing a cover one is able to reduce the flow of shield gas for blanketing the solder wave and the circuit board or wiring board passing therethrough compared with a tunnel or enclosure. Thus, wettable surfaces to be solder coated such as circuit tracks, pads, component leads, surface mounted components and metallized holes in boards with pins therein are kept substantially free of air. The shield gas which is preferably nitrogen and is substantially oxygen free, is introduced below the cover and passes up through a slot through which the solder wave projects on both sides of the solder wave to blanket the solder wave and also blanket the bottom surface of a circuit board passing through the solder wave as well as the edges of the circuit board.

Circuit boards are conveyed to pass through a solder wave by different types of conveyors. In one embodiment the circuit boards are supported by gripping fingers from two separate parallel conveyors. In another embodiment the circuit boards are supported on pallets, fixtures or frames which in turn are supported either by two separate conveyors gripping side edges, or by a single conveyor. If two parallel conveyors are used with gripping fingers, then there is provision to adjust the distance between the conveyors to take into account variable widths of conveyors or different sizes of pallets, fixtures or frames to support circuit boards.

DISCLOSURE OF INVENTION

When shield gas passes up through the slot in the cover plate on both sides of the solder wave it blankets the under surface of the leading or front edge, and the trailing or rear edge of the circuit board, but, the blanketing is not always uniform and the side edges of the circuit board in some instances are only partially blanketed as air, perhaps entrained in the conveyor fingers dilutes the shield gas at the ends of the circuit boards. Thus, it is an aim of the present invention to provide end shrouds in the form of panels that direct shield gas passing up through the slot in the cover on both sides of the solder wave to also blanket the side edges of the circuit board and preferably ensure that there is a substantially uniform blanketing of the circuit board on the under surface, the front edge, rear edge and side edges prior to, during and subsequent to the passing of the circuit board through the solder wave.

By utilizing end shrouds it has been found that the consumption of shield gas required to blanket the under surface and edges of the board uniformly is reduced considerably and this results in one being able to provide a shield gas, in one embodiment, nitrogen produced by a membrane source. The nitrogen, while being substantially oxygen free, may in some situations have up to 10% by volume present in the shield gas.

The present invention provides a process of wave soldering an element comprising the steps of projecting at least one solder wave from a solder nozzle above a solder reservoir containing solder, through a slot in a cover means over at least a portion of the solder reservoir; providing gas delivery means positioned on each side of the solder wave underneath the cover means to pass shield gas upwards through the slot on both sides of the solder wave and blanket the solder wave; supporting the element by conveyor means; conveying the element by the conveyor means in a predetermined path above the cover means so that at least a portion of the element passes through the solder wave while blanketed by the shield gas, and directing shield gas passing upwards through the slot to blanket side edges of the element during the passing of at least a portion of the element through the solder wave.

In another embodiment there is provided an apparatus for wave soldering an element comprising a solder reservoir adapted to contain molten solder, and having at least one solder wave nozzle projecting therefrom; pump means for forming a solder wave from the nozzle; cover means for covering at least a portion of the reservoir having at least one longitudinal slot for the solder wave to pass therethrough; gas delivery means for supplying gas underneath the cover means, the gas passing upwards through the slot on both sides of the solder wave to provide a gas blanket over the solder wave; conveyor means for supporting the element and moving the element in a predetermined path over the cover means ensuring at least a portion of the element passes through the solder wave, and end shroud means over each end of the solder wave to direct the gas passing upwards through the slot in the cover means to blanket side edges of the element during the passing of at least a portion of the element through the solder wave.

BRIEF DESCRIPTION OF DRAWINGS

In drawings which illustrate embodiments of the present invention,

FIG. 1 is a side view showing a solder wave with a cover plate and end shroud plate and having gripping fringes of a conveyor supporting a circuit board, FIG. 2 is a longitudinal sectional view taken at line 2—2 of FIG. 1, FIG. 3 is a partial longitudinal sectional view similar to FIG. 2, showing the gripping fingers of the adjustable conveyor repositioned to grip a smaller circuit board, FIG. 4 is a sectional view at line 4—4 of FIG. 2.

MODES FOR CARRYING OUT THE INVENTION

Figure 5:
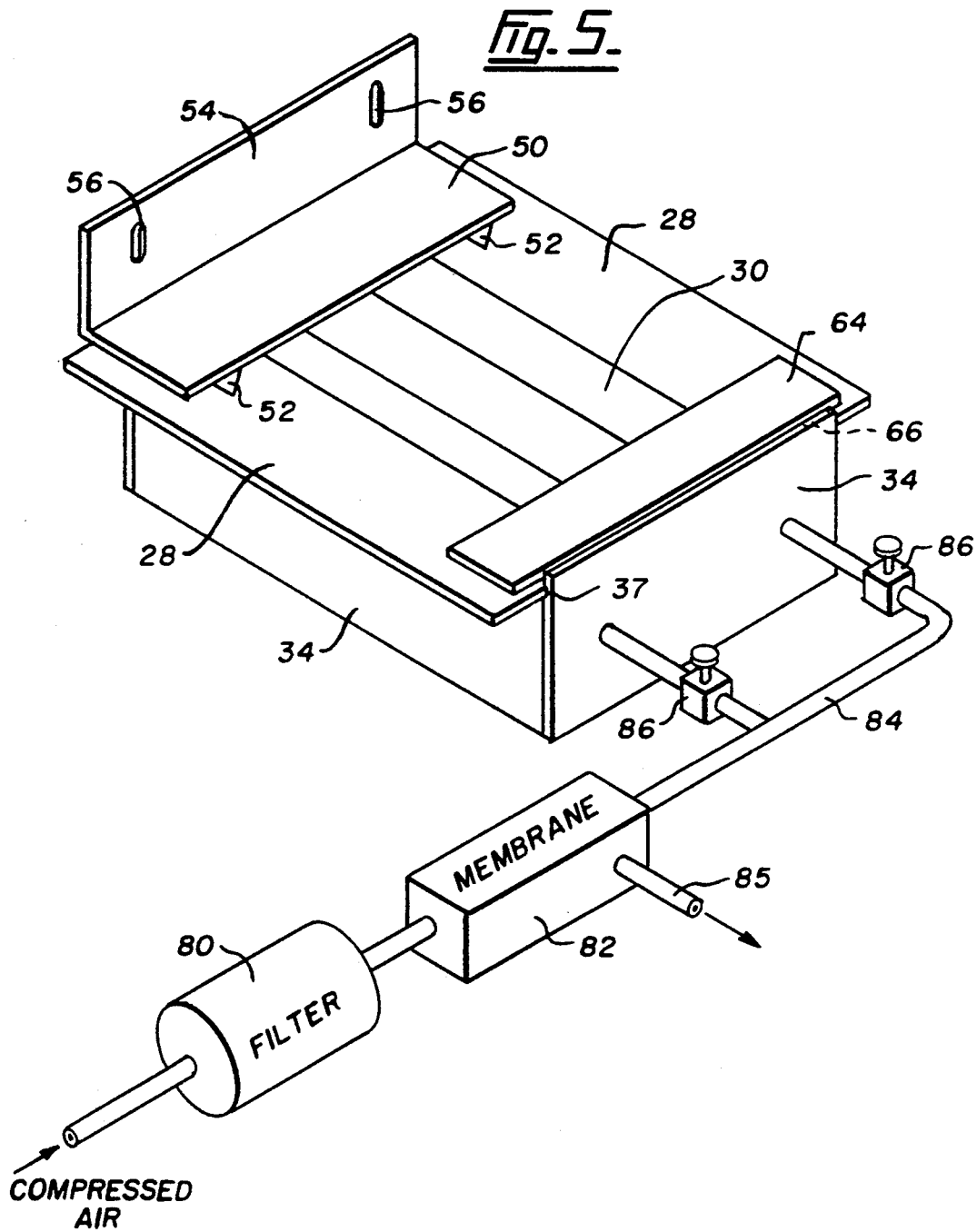
FIG. 5 is an isometric view showing the cover plates and end shroud plates for a solder wave according to one embodiment of the present invention and also showing a nitrogen supply utilizing membrane technology.

As shown in FIG. 1 a solder reservoir 18 has solder therein up to a solder level 20. A solder wave 22 projects from a solder nozzle 24 and a solder pump 26 pumps solder up through the nozzle 24 to form the solder wave 22. The solder pump 26 is preferably a variable speed pump, thus one is able to control the flow of solder from the solder wave 22 and raise or lower the crest of the solder wave 22 to suit specific soldering conditions.

A cover plate 28 extends over a portion of the reservoir 18 on both sides of the solder wave 22 and has a slot 30 therebetween through which the solder wave 22 projects. The solder wave 22 shown is a bi-directional non-turbulent solder wave and has guides 32 to provide a smooth streamline flow of solder falling back into the solder reservoir. The present invention is not limited to any one type of solder wave. Skirts 34 extend downwards from the cover plate 28 beneath the solder level 20 to form an enclosure around the solder wave 22 except for the slot 30. Gas diffusers 36 are positioned under the cover plate 28 on both sides of the solder wave 22 and shield gas is supplied through the diffusers to flow upwards passing through the slot 30 on both sides of the solder wave 22 and blanket the solder wave.

As seen more clearly in FIG. 2, there are two cover plates 28 whose side edges fit in grooves 37 in the opposing side skirts 34. The cover plates 28 may be moved in the grooves 37 and clamped in place so the width of slot 30 can be adjusted to suit different configurations of solder wave 22. In the embodiment shown, the side skirts 34 are integral with the sides of the nozzle 24 so the cover plates 38 are supported from the solder nozzle 24. In another embodiment the side skirts 34 are adjacent to sides of the nozzle 24 and provision is made for varying the height of the cover plates 28 relative to the solder nozzle 24.

The cover plates 28 are sloped upwards parallel to a predetermined path 38 of two conveyors 39,40 which have gripping fingers 41,42 respectively to support side edges of a circuit board 44, as seen more clearly in FIG. 2. Whereas the predetermined path 38 is shown sloped, in another embodiment the path 38 may be substantially horizontal.

As shown in FIG. 2, skirts 34 extend down from the cover plate 28 on all four sides to ensure that the solder wave 22 is completely enclosed by the skirts 34, thus shield gas supplied through diffusers 36 prevents air from contacting the solder wave or the reservoir solder surface under the cover plate 28. The first conveyor 39 is supported from an adjustable rail 46 and has a ramp 48 for the returning conveyor fingers 41, the ramp 48 raises the returning fingers 41 so they are out of the way for an end shroud panel 50 which has silicone rubber V-shaped ribs 52 in the form of a U, the side ribs rest on top of the cover plate 28 on both sides of slot 30 projecting almost as far as the fingers 39 and the joining rib passes through a tip of the solder wave 22 as can be seen in FIG. 4, thus substantially preventing shield gas exiting from the end of the solder wave 22 as it passes upwards through the slot 30 in the cover plate 28. The end shroud panel 50 has a vertical plate 54 to form a right angle with the end shroud panel 50 and has slots 56 therein as shown in FIG. 5 for bolts 58 to attach to an angle bracket 60 fixed to the adjustable rail 46 supporting the first conveyor 39. Thus, when the adjustable rail 46 is moved to another position for the gripping fingers 40 to support different sized circuit boards 44, then the end shroud panel 50 and ribs 52 move with it to ensure that the gripping fingers 41 and side edges of the circuit board 44 are always blanketed by shield gas passing up through the slot 30 in the cover plate 28. The second conveyor 40 is attached to a fixed rail 62 and an end shroud panel 64 with V-shaped ribs 66 of silicone rubber is positioned underneath the fixed rail 62 resting on the cover plate 28.

As shown in FIG. 3, when the adjustable rail 46 supporting the first conveyor 39 is moved across the solder wave 22 to support a smaller circuit board 44, then an additional end shroud panel 68 having V-shaped ribs 70 of silicone rubber is placed between the end shroud panel 50 and the end of the solder wave 22 shown at skirt 34 in FIG. 3. Thus, the solder wave 22 is not open to air. Shield gas passing up through slot 30 in the cover plate 28 covers the solder wave and does not escape into the atmosphere. In this manner the flow of shield gas is reduced and at the same time the shield gas blankets the opposite side edges of the solder wave and consequently blankets the side edges of the circuit boards 44 as well as the underside, and front edge and rear edge, prior to entering the solder wave, during the time that the circuit boards 44 pass through the solder wave and after they have left the solder wave. The solder wave replaces the gas blanket as a board passes through.

Whereas the drawings show conveyor fingers 41,42 gripping a circuit board 44, in other embodiments, the boards are supported on pallets, fixtures or frames, in some cases specially made for different types of elements. The conveyors may have fingers to grip side edges or alternatively may be supported from above. In all cases the side edges of the elements, such as circuit boards are blanketed during their passage through the solder wave.

A vibrating vane 72 is connected to a vibrator 74 by rod 76 to provide a vibration to the solder wave. The solder wave is oscillated in accordance with the vibratory wave soldering arrangement as disclosed in U.S. Pat. No. 4,684,056.

An in situ shield gas supply source is provided in one embodiment. This is feasible because the gas supply is less than required for existing shield gas soldering systems. Nitrogen, carbon dioxide and other inert gases may be supplied as a shield gas. An on site non-cryogenic nitrogen supply may be provided. There are different devices known to produce nitrogen with less than 10% by volume oxygen present.

A nitrogen supply source is shown schematically in FIG. 5 wherein compressed air is supplied through a filter 80 and into a membrane apparatus 82, the membrane apparatus includes a membrane therein which splits the air flow into two portions, one being a nitrogen enriched portion and this portion continues along line 84, the oxygen enriched flow portion passes through line 85 back into the atmosphere. In one embodiment the membrane apparatus produces nitrogen with an oxygen content of less than 10% by volume. In another embodiment not shown herein a second stage membrane system may be provided wherein the oxygen content of the nitrogen is reduced to less than 5% by volume and in another embodiment to less than 1,000 ppm. The system for providing a nitrogen enriched air flow using the membrane technology is known. If there is a high demand of nitrogen, and this depends primarily upon soldering conditions, then the concentration of oxygen is higher, however, if the demand is less, then the concentration of oxygen is less. In one embodiment the requirement of nitrogen passing through two control valves 86 which in turn are connected to the gas diffusers 36 on each side of the solder wave 22 beneath the cover plate 20, is in the range of 200 to 600 cubic feet per hour from both diffusers which is considerably less than normally required for shield gas soldering. As can be seen, the gas supply to the two diffusers 36 can be varied by the flow control valves 86 which in turn controls the flow of gas exiting from the slot 30 in the cover plate 28 on each side of the solder wave 22. A preferred process provides for the nitrogen supply to be turned off except when a printed circuit board is passing over the solder reservoir. This is achieved by turning off the compressed air supply when the membrane apparatus is used.

Whereas nitrogen has been referred to as a preferred embodiment for shield gas, other inert gases may be provided, carbon dioxide being one example. In all cases it is preferred to keep the oxygen content less than about 10% by volume.

Various changes may be made to the embodiments shown herein without departing from the scope of the present invention which is limited only by the following claims.

The embodiments of the present invention in which an exclusive property or privilege is claimed are defined as follows:

1. A process of wave soldering an element comprising the steps of:
   projecting at least one solder wave from a solder nozzle above a solder reservoir containing solder, through a slot in a cover means over at least a portion of the solder reservoir;
   providing gas delivery means positioned on each side of the solder wave underneath the cover means to pass shield gas upwards through the slot on both sides of the solder wave and blanket the solder wave;
   supporting the element by conveyor means;
   conveying the element by the conveyor means in a predetermined path above the cover means so that at least a portion of the element passes through the solder wave while blanketed by the shield gas, and
   directing shield gas passing upwards through the slot to blanket side edges of the element during the passing of at least a portion of the element through the solder wave.

2. The process of wave soldering an element according to claim 1 wherein the element is a printed circuit board having an under surface, a front edge, a rear edge and opposing side edges, the front edge passing through the solder wave first, the solder wave contacting the under surface of the circuit board, and the rear edge leaving the solder wave last.

3. The process of wave soldering an element according to claim 2 wherein the conveyor means comprises a first conveyor having gripping means supported by a first rail at one end of the solder wave and a second conveyor having gripping means supported by a second rail at the other end of the solder wave, the distance between the gripping means of the first conveyor and the gripping means of the second conveyor being adjustable for different sizes of printed circuit boards.

4. The process of wave soldering an element according to claim 3 wherein the gripping means are gripping fingers which grip the opposing side edges of the circuit board.

5. The process for wave soldering an element according to claim 3 wherein the shield gas is directed by end shroud means to substantially uniform blanketing of the gripping means of the first and second conveyors and the side edges of the printed circuit board during the passing of at least a portion of the element through the solder wave.

6. The process of wave soldering an element according to claim 5 wherein the end shroud means includes end shroud panels fitting over each end of the solder wave, the end shroud panels being at an elevation above the solder wave and having sealing means resting on the cover means and extending through a portion of the solder wave.

7. The process of wave soldering an element according to claim 1 wherein the shield gas is substantially oxygen free.

8. The process of wave soldering an element according to claim 1 wherein the shield gas is primarily nitrogen.

9. The process of wave soldering an element according to claim 8 wherein the nitrogen is made by a membrane process.

10. The process of wave soldering an element according to claim 9 wherein the nitrogen has an oxygen content of less than about 10% by volume.

11. The process of wave soldering an element according to claim 9 wherein the nitrogen has an oxygen content of less than about 5% by volume.

12. The process of wave soldering an element according to claim 8 wherein the nitrogen has an oxygen content in the range of about 1 ppm to 50,000 ppm by volume.

13. The process of wave soldering an element according to claim 9 wherein the nitrogen flow is in the range of about 200 to 600 cubic feet per hour.

14. The process of wave soldering an element according to claim 1 wherein the shield gas is primarily carbon dioxide.

15. The process of wave soldering an element according to claim 14 wherein the carbon dioxide has an oxygen content of less than about 10% by volume.

16. The process of wave soldering an element according to claim 1 wherein the gas delivery means comprise gas diffusers positioned on each side of the solder wave underneath the cover means.

17. The process of wave soldering an element according to claim 1 wherein the solder wave is a bi-directional non-turbulent flow solder wave.

18. The process of wave soldering an element according to claim 1 wherein the solder wave is vibrated.

19. The process of wave soldering an element according to claim 1 wherein the shield gas is supplied only when the element is passing over the solder reservoir.

20. The process of wave soldering an element according to claim 2 wherein the solder wave is projected from the solder nozzle and the shield gas is supplied only in the presence of a board about to pass through the solder wave.

21. The process of wave soldering an element according to claim 1 wherein the shield gas blankets the side edges of the element prior to, during and subsequent to the passing of at least a portion of the element through the solder wave.

22. A process of wave soldering a printed circuit board having an under surface, front edge, rear edge and side edges, comprising the steps of:
projecting at least one solder wave from a solder nozzle above a solder reservoir containing solder, through a slot in a cover means over at least a portion of the solder reservoir;
providing gas delivery means underneath the cover means to pass shield gas upwards through the slot on both sides of the solder wave and blanket the solder wave;
conveying the circuit board by conveyor means in a predetermined path above the cover means, the front edge of the circuit board entering the solder wave, the circuit board passing through the solder wave contacting the under surface of the circuit board, the rear edge of the circuit board exiting the solder wave, while the front edge, under surface and rear edge of the circuit board are blanketed by the shield gas, and
directing shield gas to blanket the side edges of the circuit board passing through the solder wave.

23. The process of wave soldering a circuit board according to claim 22 wherein the under surface, front edge, rear edge and side edges of the circuit board are blanketed by shield gas substantially uniformly while passing through the solder wave.

24. The process of wave soldering a circuit board according to claim 22 wherein shield gas is directed in a direction substantially perpendicular to the predetermined path from ends of the solder wave towards the side edges of the circuit board passing through the solder wave.

25. The process of wave soldering a circuit board according to claim 22 wherein air is substantially excluded from the side edges of the circuit board by end shroud means.

26. An apparatus for wave soldering an element comprising:
a solder reservoir adapted to contain molten solder, and having at least one solder wave nozzle projecting therefrom;
pump means for forming a solder wave from the nozzle;
cover means for covering at least a portion of the reservoir having at least one longitudinal slot for the solder wave to pass therethrough;
gas delivery means for supplying gas underneath the cover means, the gas passing upwards through the slot on both sides of the solder wave to provide a gas blanket over the solder wave;
conveyor means for supporting the element and moving the element in a predetermined path over the cover means ensuring at least a portion of the element passes through the solder wave, and
end shroud means over each end of the solder wave to direct the gas passing upwards through the slot in the cover means to blanket side edges of the element during the passing of at least a portion of the element through the solder wave.

27. The apparatus for wave soldering an element according to claim 26 wherein the conveyor means comprises a first conveyor having gripping means, the first conveyor at one end of the solder wave supported by a first rail and a second conveyor having gripping means, the second conveyor at the other end of the solder wave supported by a second rail, adjustment means to vary the distance between the gripping means of the first conveyor and the gripping means of the second conveyor for different sizes of elements.

28. The apparatus for wave soldering an element according to claim 27 wherein the gripping means comprises gripping fingers to grip the side edges of the board.

29. The apparatus for wave soldering an element according to claim 27 wherein the first rail is a fixed rail and the second rail is an adjustable rail.

30. The apparatus for wave soldering an element according to claim 27 wherein the end shroud means comprise a first end shroud panel resting on the cover means beneath the fixed rail of the first conveyor and a second end shroud panel resting on the cover means connected to the adjustable rail supporting the second conveyor.

31. The apparatus for wave soldering an element according to claim 30 wherein the first and second end shroud panels have silicone rubber rib seals in a U-configuration extending on both sides of the solder wave and across the solder wave to pass through a tip of the solder wave.

32. The apparatus for wave soldering an element according to claim 30 including at least one extra end shroud panel to cover an exposed end of the solder wave when the adjustable rail for the second conveyor is moved towards the fixed rail of the first conveyor.

33. The apparatus for wave soldering an element according to claim 26 wherein the end shroud means over each end of the solder wave ensures substantially uniform gas blanketing of the element ends during the passing of at least a portion of the element through the solder wave.

34. The apparatus for wave soldering an element according to claim 26 including a membrane nitrogen producing means to produce nitrogen for the gas delivery means.

35. The apparatus for wave soldering an element according to claim 26 wherein the cover means comprises a cover plate on each side of the solder wave extending over at least a portion of the reservoir and having skirts at four edges of the cover plate, the skirts substantially sealed at corners extending down below a level representing a solder level in the reservoir.

36. The apparatus for wave soldering an element according to claim 35 wherein each cover plate is supported at each side by side skirts and including means for sliding each cover plate to change the width of the longitudinal slot.

37. The apparatus for wave soldering an element according to claim 26 wherein the cover means is supported from the solder wave nozzle.

38. The apparatus for wave soldering an element according to claim 26 wherein the gas delivery means extends on both sides of the solder wave below the cover means.

39. The apparatus for wave soldering an element according to claim 38 wherein the gas delivery means comprise gas diffusers.

40. The apparatus for wave soldering an element according to claim 26 including vibratory means in the solder wave nozzle to vibrate the solder wave.

41. The apparatus for wave soldering an element according to claim 26 wherein the pump means has variable adjustment for changing the configuration of the solder wave from the nozzle.

42. The apparatus for wave soldering an element according to claim 26 wherein at least one solder wave nozzle produces a bi-directional non-turbulent solder wave.

43. The apparatus for wave soldering an element according to claim 26 including an on site non-cryogenic nitrogen producing means.

44. The process of wave soldering an element according to claim 8 wherein the nitrogen is made on site by a non-cryogenic process.

* * * * *